June 27, 1933.  C. B. CLARK  1,915,270
PROCESS OF MAKING CONTACT SULPHURIC ACID
Filed March 21, 1930
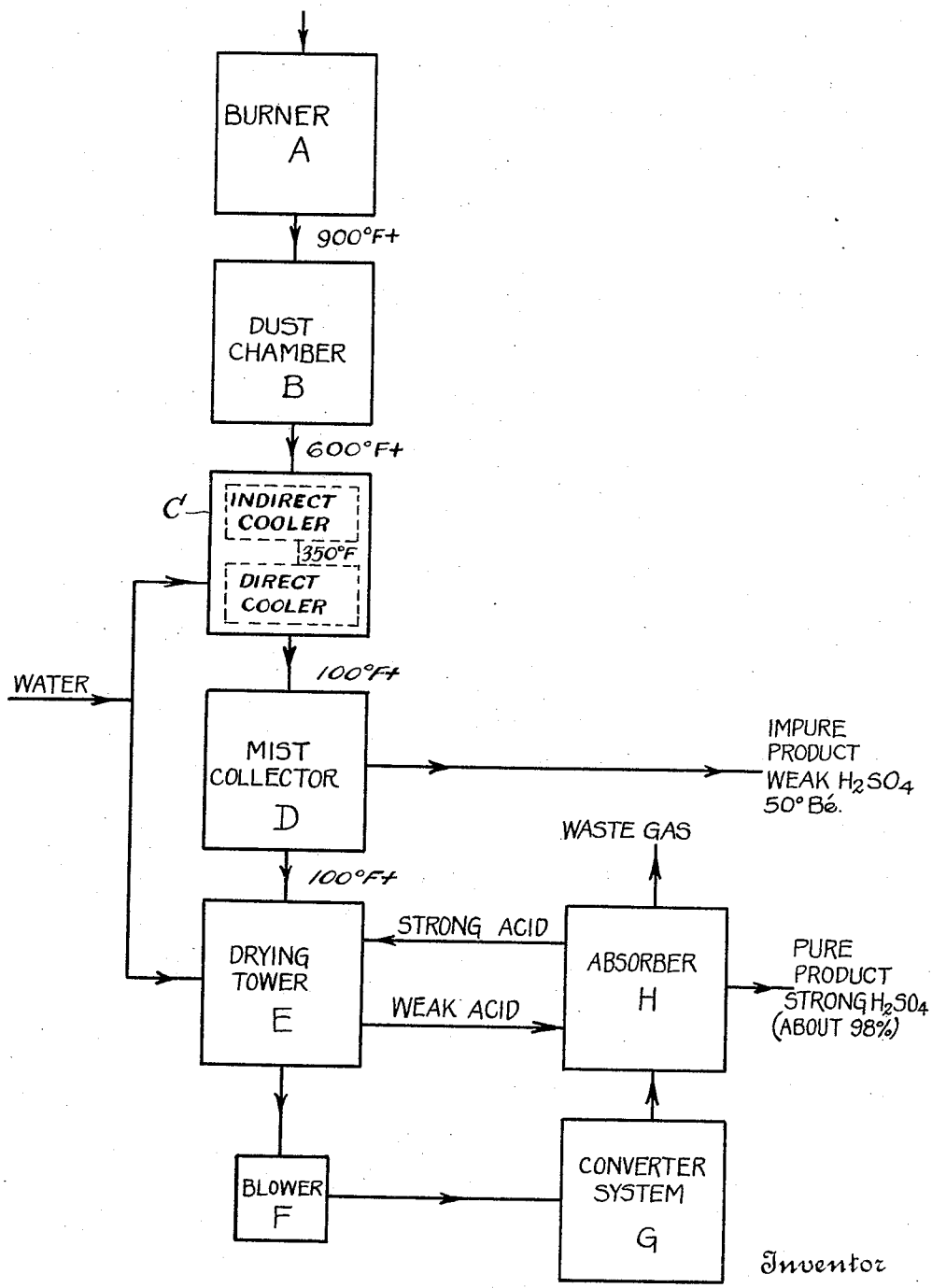

Patented June 27, 1933

1,915,270

UNITED STATES PATENT OFFICE

CYRIL B. CLARK, OF SCARSDALE, NEW YORK, ASSIGNOR TO CATALYTIC PROCESS CORPORATION, OF NEW YORK, N. Y., A CORPORATION OF DELAWARE

PROCESS OF MAKING CONTACT SULPHURIC ACID

Application filed March 21, 1930. Serial No. 437,645.

My invention relates more particularly to improved methods of making sulphuric anhydrid by the catalytic oxidation of sulphur dioxide when employing as the raw material for the production of sulphur dioxide gas mixture various sulphur containing materials having compounds that form gaseous impurities in the burner gas.

Heretofore it has been necessary to cool such gases to approximately atmospheric temperature, or below 100° F., to remove such impurities and prevent poisoning of the catalysts customarily employed in the converter.

According to my invention, I first remove the greater amount of dust from the burner gases containing $SO_2$ and oxygen, and then cool the gas below the condensation point of sulphuric acid (about 600° F.), but not below the point heretofore required to eliminate gaseous impurities. I thereafter treat these gases to remove sulphuric acid mist and then such gases are dried by passing same directly to a drying tower without lowering their temperature, and then such dried gases are contacted with suitable catalytic material until about 97-98% conversion is obtained, followed by absorption of the sulphuric anhydrid formed. My entire process from the production of the burner gases to the drying tower is conducted without cooling the gas below the temperature heretofore needed to remove gaseous impurities (under 100° F.), thereby dispensing with this expensive step in the purification operation before catalysis.

Other novel features of my process will be pointed out as the detailed procedure is described in connection with the apparatus diagrammatically shown in the accompanying flow-sheet drawing.

In this drawing the ore burner A may consist in any type suitable for burning iron sulphide ores under the conditions hereinafter described. In this burner A a gas mixture is formed which will be approximately a 7% $SO_2$ gas having a temperature of about 900° F., and the temperature of which as the gas leaves the burner A will be designated as 900° F+. The air required to support combustion and to form part of the gas therein is drawn into the burner A by any suitable type of blower or fan F.

The hot gases from the burner A are then passed through a dust chamber B which may be of any type suitable for precipitating the greater part of the dust in the gas mixture. The gas leaving the dust chamber B will have a temperature of about 600° F., such temperature of the gas passing out of the dust chamber B being designated as 600° F+.

The hot gases from the dust chamber B then pass into a cooling tower C which may comprise an upper section in which the gases are cooled to about 350° F. by contact with the walls of the tower C cooled by water circulated through the walls of the tower but out of contact with the gas. The lower part of the tower C comprises a chamber in which a controlled amount of water is introduced into the gas as indicated in the drawing. This water is introduced into the tower C in sufficient amount to cool the gas about 180° F. more or less as required.

The gases leaving the cooler C will be fully saturated with moisture and at a temperature of about 170° F., although it may be lower or higher as desired; such temperature of the gas leaving the cooler will be designated as 100° F+.

The gases still hot and without further cooling are then passed to a mist collector D which may be of the filter or Cottrell type suitably modified for the collection of sulphuric acid mist formed in this process.

According to the procedure just described the gases will be in equilibrium with sulphuric acid of about 50° Bé. strength, and will also contain moisture approximately equal in volume to the $SO_2$ content. The now purified gases pass directly to a drying tower E without further cooling of the gases. In this drying tower E of any suitable design, the gases are contacted with the strong sulphuric acid from the absorber H after dilution with water to remove the moisture. The gases then pass through the blower F to the converter system G.

In the converter system the gases are contacted with any one of the various "Selden" vanadium catalysts now available such as are described in U. S. Jaeger Patents Nos. 1,675,308 and 1,675,309 of June 28, 1928 and No. 1,694,123 of December 4, 1928 and the $SO_2$ is converted to $SO_3$ to the extent of from 97 to 98%.

The gases upon leaving the converter system G of any of the well-known types in which the hot out-going gases are in heat relation so as to heat up the colder in-going gases, pass to the absorber H which may be of any convenient type, but I prefer a tower in which the gases are contacted with sulphuric acid of about 99% strength. The water required for combination with the $SO_3$ is chiefly derived from the moisture added to the burner gas in the cooler C, absorbed from the gas in the drying tower E, and then transferred to the absorbing tower as weak acid. When making 99% acid in the absorber H the water content of the acid entering the drier E is always kept a little lower than the amount required to produce 99% acid, and a small amount of additional water is added either to the drying tower E or the absorbing tower H to maintain the acid at the strength desired.

During the entire progress of the gases from the time they leave the ore burner A until they enter the drying tower E as purified gases, no cooling of such gases down to near atmospheric temperature, or under 100° F., has occurred. In short the gases are never permitted to become so cool as to deposit moisture after leaving the cooler C. Consequently no formation of weak acid takes place which must be thrown away because of the impurities contained therein, and there is no weak acid requiring subsequent concentration in order to convert same into a marketable product.

Two steps in the usual purification processes heretofore considered essential, are (1) cooling the gases to 100° F. or under which is very expensive due to the low temperature difference between the gases and the air or water used for cooling, and (2) discarding weak acid from the system or the introduction of an alkaline wash in order to eliminate chlorine or other gaseous impurities. The necessity of the extreme cooling of the gases by indirect means I have avoided, and the heat remaining in the gas is removed in the drying tower E if desired by direct contact with cool acid.

Since the gases are maintained from the ore burner A to the drying tower E at a temperature substantially above 100° F., it will be apparent that the gas so produced and under treatment will contain various gaseous impurities, such as chlorine and fluorine, to some extent as they enter the drying tower E. Chlorine and fluorine and other gaseous impurities entering such drying tower are dissolved in the drying tower acid and are transferred to the absorbing tower H, thereby being taken out of the gas at a point by-passing the converter G and are then transferred to a point beyond such converter. In the absorber H most of the fluorine, chlorine and other gaseous impurities are eliminated from the acid and pass out with the waste gases.

To obtain an efficient removal of the chlorine, fluorine, etc., the acid in the drying tower E is maintained at a lower strength and temperature than the absorbing acid. All of the precautions and steps heretofore required for removing the gaseous impurities, such as chlorine, fluorine, etc., from the purification process are eliminated, and my improved process is much simpler than in the usual methods now used.

Upon the creation of the $SO_2$ gas mixture it has been thought necessary to purify the gas not only of chlorine but of many other ingredients, such as arsenic, sulphuric acid in the form of a suspended mist, and other impurities. Even when the practically pure sulphur was used as the source of $SO_2$, it has been deemed necessary and essential to purify the gases and particularly to remove chlorine impurities. The removal of these impurities invariably involved a reduction of the temperature of the gases to about atmospheric temperature or under 100° F.

I have discovered that if the temperature of the gases leaving the cooler C are maintained substantially above 100° F. but below 600° F., from the time they leave the cooler C until they reach the drying tower E, and if the chlorine, fluorine and other gaseous impurities are by-passed the converter G in the acid as described, satisfactory conversion may be obtained without poisoning the catalytic material, and without destroying the apparatus, and with an efficiency equal to that of the usual process but at much less expense than the purification processes heretofore used.

My improved process applies to all raw materials containing chlorine, fluorine or other compounds producing gaseous impurities in the burner gas to such an extent that it has been heretofore necessary to cool the gases to about 100° F. or less to remove these impurities and also to eliminate such impurities by discarding weak acid or using an alkaline wash to protect the catalyst.

The chlorine may be present as an original constituent of the raw material used, or it may be introduced as salt water when the raw material is shipped by ocean freight. As an example of such raw materials I mention such ores as the Spanish iron pyrites of the type known as Rio Tinto, or brimstone containing originally or contaminated with chlorine.

These materials although containing appreciable quantities of chlorine and other gaseous impurities when treated in accordance with my process omitting the cooling and chlorine eliminating steps heretofore required and also where the gaseous impurities are by-passed the converter as hereinbefore described, do not result in the poisoning of the vanadium catalyst used in the converter system or in any way decrease its efficiency. When operating as described no decrease in the efficiency of the vanadium catalyst takes place although the various steps in the purification system have been eliminated. In spite of the removal of part of the gaseous impurities in the 50° Bé. acid from the mist collector D and the by-passing of the gases by the converted system G, the gases conducted to the converter according to my process may contain more chlorine and fluorine than that required to materially reduce the efficiency of platinum catalysts.

I have also discovered that with the types of raw materials described and also with the simplified purification steps described, the "Selden" vanadium catalysts will continue to remain active so as to give the 97–98% conversion ordinarily obtained with a platinum catalyst. The chlorine gas, which under ordinary conditions will poison platinum catalyst, has no effect on these vanadium catalysts, and seems under the special conditions of my new process, either to relinquish this function or to exercise it in a non-injurious manner.

The discarding of weak acid containing chlorine, etc., or the alkaline wash for chlorine removal are also eliminated. No acid is thrown away and yields are therefore increased. By means of my invention the undesired cooling of the burner gases to under about 100° F. is eliminated, and an expensive step in the purification operation is thus dispensed with. The concentration of the purification acid is also eliminated thereby dispensing with another troublesome and expensive practice in former methods.

So long as the gases are maintained at 100° F. or substantially above this temperature from the burner A up to the drying tower E and the gases are then passed along through the converter G until 97 to 98% conversion is achieved, such methods come within the scope of my invention.

I claim as my invention:—

1. The process of making contact sulphuric acid from a moisture-containing impure sulphur dioxide gas mixture which comprises, removing the dust and fume therefrom, cooling the gases below the condensation point of sulphuric acid, removing sulphuric acid mist from the cooled gases and drying the latter, then contacting the dried gases with catalytic material to obtain about 97–98% conversion, and condensing the sulphuric anhydrid formed, the temperature of the gases throughout the successive steps being maintained above 100° F.

2. The process of making contact sulphuric acid from a moisture-containing impure sulphur dioxide gas mixture which comprises, removing the dust and fume therefrom, cooling the gases below the condensation point of sulphuric acid, removing sulphuric acid mist from the cooled gases and drying the latter, then contacting the dried gases with catalytic material to obtain about 97–98% conversion, and condensing the sulphuric anhydrid formed, the temperature of the gases throughout the successive steps being maintained above 125° F.

3. The process of making contact sulphuric acid from a moisture-containing impure sulphur dioxide gas mixture which comprises, removing the dust and fume therefrom, cooling the gases below the condensation point of sulphuric acid, removing sulphuric acid mist from the cooled gases and drying the latter, then contacting the dried gases with catalytic material to obtain about 97–98% conversion, and condensing the sulphuric anhydrid formed, the temperature of the gases throughout the successive steps being maintained above 150° F.

4. The process of making contact sulphuric acid from a moisture-containing impure sulphur dioxide gas mixture which comprises, removing the dust and fume therefrom, cooling the gases below the condensation point of sulphuric acid, removing sulphuric acid mist from the cooled gases and drying the latter, then contacting the dried gases with a catalyst of the vanadium type to obtain about 97–98% conversion, and condensing the sulphuric anhydrid formed, the temperature of the gases throughout the successive steps being maintained above 100° F.

5. The process of making contact sulphuric acid from a moisture-containing impure sulphur dioxide gas mixture which comprises, removing the dust and fume therefrom, cooling the gases below the condensation point of sulphuric acid, removing sulphuric acid mist from the cooled gases and drying the latter, then contacting the dried gases with a catalyst of the vanadium type to obtain about 97–98% conversion, and condensing the sulphuric anhydrid formed, the temperature of the gases throughout the successive steps being maintained above 125° F.

6. The process of making contact sulphuric acid from a moisture-containing impure sulphur dioxide gas mixture which comprises, removing the dust and fume therefrom, cooling the gases below the condensation point of sulphuric acid, removing sulphuric acid mist from the cooled gases and drying the latter, then contacting the dried gases with a catalyst of the vanadium type to obtain about 97–98% conversion, and condensing the sulphuric anhyrid formed, the temperature of the gases throughout the successive steps being maintained above 150° F.

7. The process of making contact sulphuric acid from a moisture-containing impure sulphur dioxide gas mixture which comprises, removing the dust and fume therefrom, cooling the moisture saturated gases below the condensation point of sulphuric acid, removing sulphuric acid mist from the cooled gases and drying the latter, then contacting the dried gases with catalytic material to obtain about 97–98% conversion, and condensing the sulphuric anhydrid formed, the temperature of the gases throughout the successive steps being maintained above 100° F.

8. The process of making contact sulphuric acid from a moisture-containing impure sulphur dioxide gas mixture which comprises, removing the dust and fume therefrom, cooling the moisture saturated gases below the condensation point of sulphuric acid, removing sulphuric acid mist from the cooled gases and drying the latter, then contacting the dried gases with a catalyst of the vanadium type to obtain about 97–98% conversion, and condensing the sulphuric anhydrid formed, the temperature of the gases throughout the successive steps being maintained above 100° F.

9. The process of making contact sulphuric acid from a moisture-containing impure sulphur dioxide gas mixture which comprises, removing the dust and fume therefrom, cooling the gases below the condensation point of sulphuric acid, removing sulphuric acid mist from the cooled gases and drying the latter without further cooling, then contacting the dried gases with catalytic material to obtain about 97–98% conversion, and condensing the sulphuric anhydrid formed, the temperature of the gases throughout the successive steps being maintained above 100° F.

10. The process of making contact sulphuric acid from a moisture-containing impure sulphur dioxide gas mixture which comprises, removing the dust and fume therefrom, cooling the gases below the condensation point of sulphuric acid, removing sulphuric acid mist from the cooled gases and drying the latter without further cooling, then contacting the dried gases with a catalyst of the vanadium type to obtain about 97–98% conversion, and condensing the sulphuric anhydrid formed, the temperature of the gases throughout the successive steps being maintained above 100° F.

11. In a process of making contact sulphuric acid, the steps comprising drying the cooled burner gases with acid, contacting the dried gases with catalytic material to obtain about 97–98% conversion, and absorbing the sulphur trioxide formed in acid, the drying acid being weaker and at a lower temperature than the absorbing acid.

12. In a process of making contact sulphuric acid, the steps comprising drying the cooled burner gases with acid, contacting the dried gases with catalytic material to obtain about 97–98% conversion, and absorbing the sulphur trioxide formed in acid, the drying acid being weaker and at a lower temperature than the absorbing acid, and the temperature of the gases throughout these successive steps being maintained between 100°–600° F.

13. In a process of making contact sulphuric acid, the steps comprising cooling hot burner gases in contact with a water cooled surface and in contact with water to between 100°–600° F. and below the condensation point of the acid, removing sulphuric acid mist from the cooled gases, drying such gases without substantially lowering their temperature, and conducting the dried gases to the converter, the temperature of the gases throughout the successive steps being maintained above 100° F.

14. In a process of making contact sulphuric acid, the steps comprising cooling hot burner gases indirectly and directly by means of water below the condensation point of sulphuric acid, removing sulphuric acid mist from the cooled gases, drying such gases with acid without substantially lowering their temperature, conducting the dried gases to the converter, and absorbing the sulphuric anhydrid formed with acid, the drying acid being weaker and at a lower temperature than the absorbing acid, and the temperature of the gases throughout the successive steps being maintained between 100°–600° F.

15. The process of making contact sulphuric acid which comprises burning iron sulphide ores in the presence of atmospheric air to produce a relatively impure $SO_2$ gas mixture containing chlorine, fluorine and other gaseous impurities, removing the dust and fume therefrom, cooling the gas mixture below the condensation point of sulphuric acid, removing sulphuric acid mist from the cooled gases, drying such gases without substantially lowering their temperature and removing the gaseous impurities, then contacting the dried purified gases with catalytic material to obtain about 97–98% conversion, and condensing the sulphuric anhydrid formed, the impurities passing out of the system with waste gas, the temperature of the gases throughout the successive steps being maintained above 100° F.

16. The process of making contact sulphuric acid which comprises burning iron sulphide ores to produce a relatively impure $SO_2$ gas mixture containing chlorine, fluorine and other gaseous impurities, removing the dust and fume therefrom, cooling the gas mixture saturated with moisture below the condensation point of sulphuric acid, removing sulphuric acid mist from the cooled gases, drying such gases without substantially lowering their temperature and removing the gaseous impurities, then contacting the dried purified gases with a catalyst of the vanadium type to obtain about 97-98% conversion, and condensing the sulphuric anhydrid formed, the impurities passing out of the system with waste gas, the temperature of the gases throughout the successive steps being maintained above 100° F.

CYRIL B. CLARK.